Patented Nov. 7, 1922.

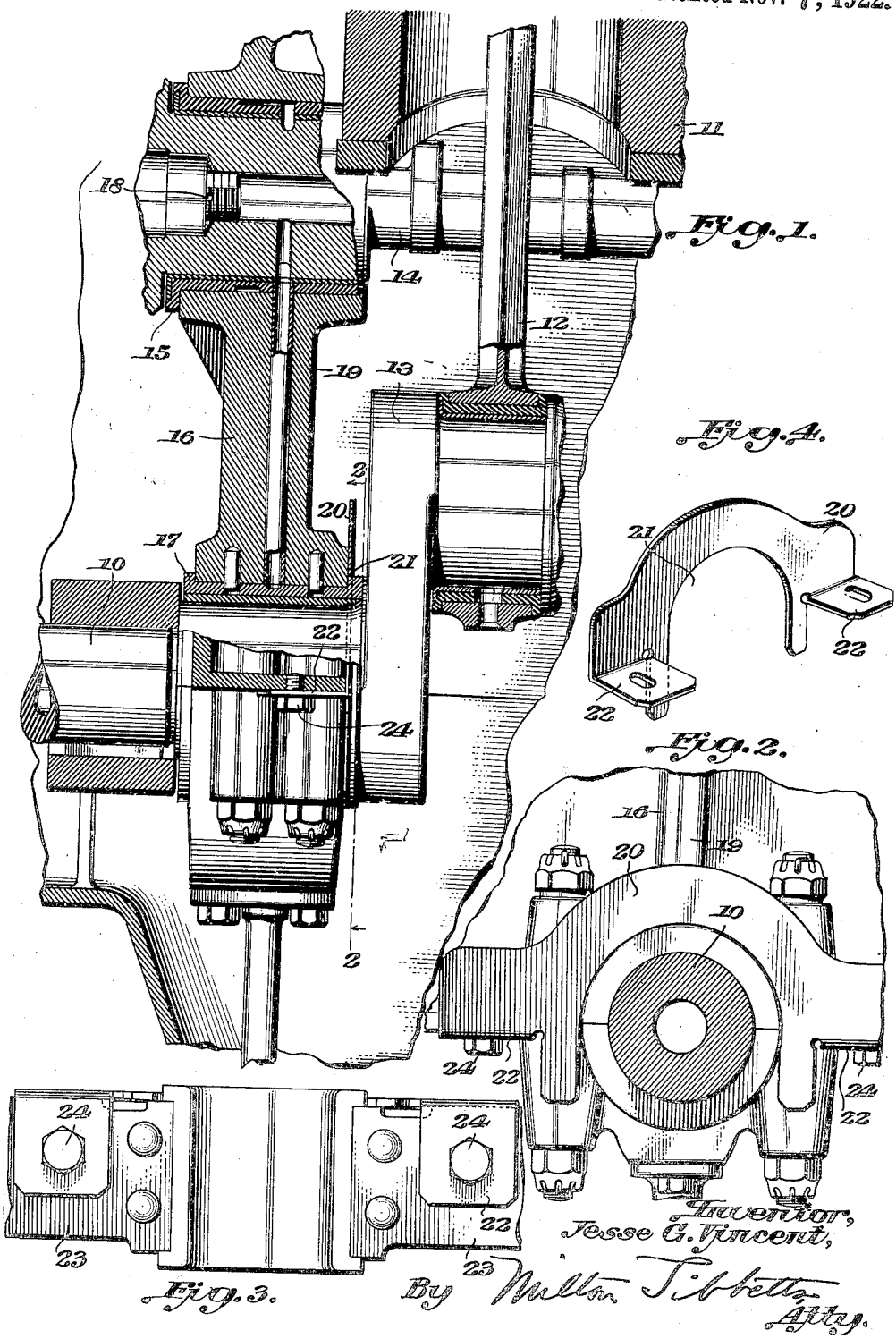

1,434,638

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed January 20, 1919. Serial No. 272,027.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to hydrocarbon motors and particularly to lubricant baffle means therefor.

In many hydrocarbon motors, as now designed, the cylinder walls are lubricated by oil thrown out by the rotation of the cranks of the crankshaft, but it has been found that an excess of oil has been thus supplied. This excess is particularly noticeable and objectionable when the motor is idling, and gives rise to carbonized cylinders and smoky exhaust, since unless the pistons are tight enough to prevent it, some of the oil will be sucked into the combustion chamber and will there be burned.

The principal object of the invention is to overcome this difficulty by providing baffle means adapted to prevent the lubricant from being carried along the crank shaft to the cheeks thereof and thus prevent the excess of oil from being thrown from the shaft into the cylinders.

Another object of the invention is to provide a particular construction of baffle means adapted to enable the same to be readily clamped upon the crank shaft bearings and so located relatively to the cam shaft and its bearings as to prevent the oil which may escape from the latter from being carried to the cheeks of the crank shaft.

With these objects in view, my invention is embodied in preferable form in the construction and arrangement hereinafter described, and illustrated in the accompanying drawings in which:

Fig. 1 is a broken vertical section through part of the crank case showing the invention applied to the crank shaft bearings;

Fig. 2 is a vertical section on the line 2—2 of Fig. 1;

Fig. 3 is a bottom plan view of the baffle plate and the bearing to which it is secured; and Fig. 4 is a detail perspective view of the baffle plate.

Referring to the drawings, 10 is a crank shaft and 11 a cylinder of a hydrocarbon motor. 12 is a connecting rod adapted to reciprocate in said cylinder and 13 represents one of the cheeks of the crank shaft to which said rod is connected. A cam shaft 14 has one section thereof mounted in bearings 15 carried by a support 16 fixed to the crank case, which at its lower end carries bearings 17 surrounding the crank shaft 10. The cam shaft is hollow and communicates by a passageway 18 with the spaces around the bearing members and also by a channel 19 extending through the support 16, with the bearings in which the crank shaft is mounted. The oil thus supplied to the cam shaft bearings sometimes escapes from the ends thereof and runs down the support 16 upon the crank shaft or upon the bearings thereof and thence works its way to the cheeks of the crank shaft and in the throw of these cheeks the oil is carried upward into the cylinders.

In order to prevent the oil from being thus carried against the cheeks there is mounted upon the bearing 17 baffle means comprising a sheet metal plate 20 lying in a vertical plane. This plate bears against the inner face of the support 16 and is adjacent the cheek 13. The plate is provided with an arch-shaped central opening 21 adapted to take over the circular bearing member 17 as shown in Fig. 2. At each lower termination of the plate 20 the same is provided with struck-up horizontal ears 22 the upper faces of which are adapted to bear against the flat surfaces 23 of the lower side of the oil box extending from the bearing 17, and bolts 24 are adapted to be passed through suitable openings in said ears and flat portions in order to retain the baffle plate in position. In the use of the device any oil that may escape from the cam shaft bearing and run down the support to the crank shaft bearing will be prevented by the baffle plate 20 from passing to the cheek 13 and thus be prevented from being thrown into the cylinder by the action of the crank shaft. The construction of the baffle plate enables it to be readily attached to and removed from the crank shaft bearing.

Having thus described my invention, what I claim and desire to secure by Letters Patent is:

1. In hydrocarbon motors, in combination with a shaft, bearings therefor, a fixed support for said bearings, and lubricant baffle means extending upward in a vertical plane and mounted on said bearings exteriorly thereof adjacent said support.

2. In hydrocarbon motors, in combination with a crank shaft, a shaft above said crank shaft, bearings for said shafts, a common support for said bearings, and lubricant baffle means adjacent said support adapted to interrupt the exterior travel of the lubricant longitudinally of the crank shaft.

3. In hydrocarbon motors, in combination with a crank shaft having a cheek, a cam shaft, bearings for said shafts, a common support for said bearings and lubricant baffle means between said support and cheek.

4. In hydrocarbon motors, in combination with a shaft, a bearing, a fixed bearing support, extending vertically above said shaft, a baffle plate extending vertically above the bearing and means to clamp said plate to the bearing.

5. In hydrocarbon motors, in combination with a crank shaft having a cheek, a cam shaft above the crank shaft, bearings for said shaft, a fixed support connecting said bearings, lubricant baffle means mounted exteriorly of the bearings and comprising an upwardly extending baffle plate lying between the support and said cheek and having integral horizontal members and means to detachably clamp said members to the bearings.

6. In a hydrocarbon motor, a crankshaft, a support therefor, and baffle means intermediate said support and an adjacent crank cheek of said shaft for preventing the oil from passing to said cheek from the crankshaft support.

7. In a hydrocarbon motor, a crankshaft, a support therefor, and means carried by said support for deflecting oil on said support away from the adjacent crankshaft cheek.

8. In a hydrocarbon motor, lubricant baffle means for a crank shaft extending upwardly in a vertical plane adjacent to the cheek.

In testimony whereof I affix my signature.

JESSE G. VINCENT.